United States Patent
Lukka et al.

(10) Patent No.: US 8,698,825 B1
(45) Date of Patent: Apr. 15, 2014

(54) SYSTEM, METHOD, AND COMPUTER PROGRAM PRODUCT FOR OPTIMIZING USE OF A VERTEX CACHE

(75) Inventors: Tuomas J. Lukka, Helsinki (FI); Tero T. Karras, Espoo (FI); Jan H. Achrenius, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 1518 days.

(21) Appl. No.: 11/943,876

(22) Filed: Nov. 21, 2007

(51) Int. Cl.
 *G09G 5/36* (2006.01)
 *G06F 13/00* (2006.01)

(52) U.S. Cl.
 USPC ............................ 345/557; 345/536; 345/556

(58) Field of Classification Search
 USPC .................................. 345/530, 536, 556, 557
 See application file for complete search history.

(56) References Cited

U.S. PATENT DOCUMENTS

| | | | | |
|---|---|---|---|---|
| 5,777,625 | A * | 7/1998 | Rossin ........................... | 345/620 |
| 5,877,773 | A * | 3/1999 | Rossin et al. .................. | 345/621 |
| 5,886,702 | A * | 3/1999 | Migdal et al. ................. | 345/423 |
| 6,175,365 | B1 * | 1/2001 | Gueziec ........................ | 345/419 |
| 6,426,747 | B1 * | 7/2002 | Hoppe et al. .................. | 345/419 |
| 6,629,210 | B1 | 9/2003 | Arimilli et al. ............... | 711/141 |
| 6,947,049 | B2 * | 9/2005 | Spitzer et al. ................. | 345/522 |
| 7,035,979 | B2 * | 4/2006 | Azevedo et al. .............. | 711/137 |
| 2004/0085312 | A1 * | 5/2004 | Buchner et al. ............... | 345/423 |
| 2008/0141131 | A1 * | 6/2008 | Cerny et al. ................... | 715/716 |

OTHER PUBLICATIONS

Deering, M. "Geometry Compression", 1995, SIGGRAPH '95 Proceedings.
Chow, M. "Optimized Geometry Compression for Real-Time Rendering", 1997, Visualization '97 Proceedings.
Farach, M., et al., "On Local Register Allocation", 1997, ACM-SIAM Symposium on Discrete Algorithms.
Hoppe, H. "Optimization of Mesh Locality for Transparent Vertex Caching", 1999, SIGGRAPH '99 Proceedings.

* cited by examiner

*Primary Examiner* — Joni Richer
(74) *Attorney, Agent, or Firm* — Zilka-Kotab, PC

(57) ABSTRACT

A system, method, and computer program product are provided for optimizing use of a vertex cache. In use, information is identified, where such information is associated with vertex data stored in a vertex cache. To this end, use of the vertex cache may be optimized utilizing the information. In one embodiment, the information may include new information derived from the vertex data, and optionally index data, prior to processing of the vertex data. Further, the vertex cache may optionally utilize the information to optimize performance of the vertex cache by minimizing a number of cache misses.

14 Claims, 7 Drawing Sheets

SYSTEM, METHOD, AND COMPUTER PROGRAM PRODUCT FOR OPTIMIZING USE OF A VERTEX CACHE

FIELD OF THE INVENTION

The present invention relates to vertex caching in computer graphics, and more particularly to optimizing vertex caching in computer graphics.

BACKGROUND

Many typical graphics processors implement a vertex cache to speed up rendering of indexed primitives. In use, when the same vertex data is used in rendering several primitives, such vertex data need not be separately transformed and lighted for each primitive. Instead, the cached (already transformed and lighted) vertex data may be used. Typically, most vertex caches used in current hardware rely on least-recently-used (LRU) or first-in first-out (FIFO)-type logic. To date, however, there has been no effective attempt to further optimize the use of vertex caches.

There is thus a need for addressing these and/or other issues associated with the prior art.

SUMMARY

A system, method, and computer program product are provided for optimizing use of a vertex cache. In use, information is identified, where such information is associated with vertex data stored in a vertex cache. To this end, use of the vertex cache may be optimized utilizing the information. In one embodiment, the information may include new information derived from the vertex data, and optionally index data, prior to processing of the vertex data. Further, the vertex cache may optionally utilize the information to optimize performance of the vertex cache by minimizing a number of cache misses.

DETAILED DESCRIPTION

Figure 1:
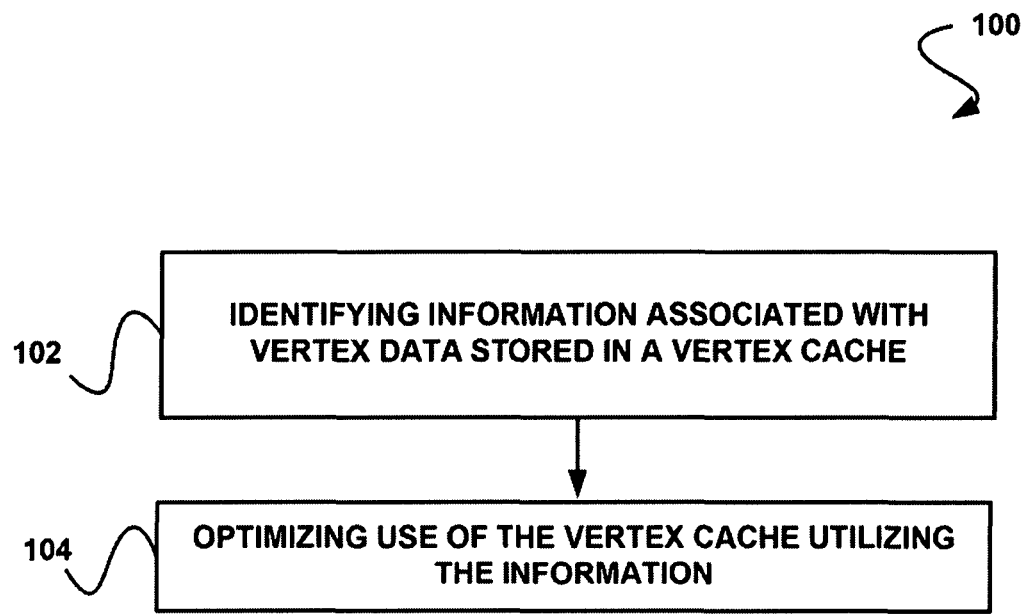
FIG. 1 shows a method for optimizing a vertex cache, in accordance with one embodiment.

FIG. 1 shows a method for optimizing a vertex cache, in accordance with one embodiment. As shown, information is identified that is associated with vertex data stored in a vertex cache. See operation 102. In the context of the present description, such vertex data refers to any data capable of being associated with at least one vertex of a primitive to be processed for visual (e.g. graphics, etc.) purposes. For example, in various embodiments, such vertex data may include, but is not limited to coordinate data, color data, and/or any other vertex data that meets the above definition. Also in the context of the present description, the vertex cache may refer to any memory capable of storing (e.g. caching, etc.) the vertex data.

Still yet, the aforementioned information may refer to any information capable of being used to optimize the vertex cache, as will soon become apparent. It should be noted that the information may take on absolutely any relationship with the vertex data.

For example, in one embodiment, the information may be stored in a separate data structure with respect to the vertex data. Specifically, the information may be stored in association with index data associated with the vertex data. Such index data may refer to indices that point to the vertex data. In use, such index data may be used to access the vertex data so that various processing may be performed on such vertex data.

Table 1 illustrates such an exemplary data structure including the index data, vertex data, and the aforementioned information.

TABLE I

| |
|---|
| Vertex Index_1 (Information_1) → Vertex_Data_1 |
| Vertex Index_2 (Information_2) → Vertex_Data_2 |
| Vertex Index_3 (Information_3) → Vertex_Data_3 |

Of course, such data structure is set forth for illustrative purposes only and should not be construed as limiting in any manner whatsoever.

It should be noted that the information may take absolutely any form. In one embodiment, the information may simply include at least one bit per vertex index. In terms of the exemplary data structure of Table 1, the information may be stored with the index data itself. Optionally, the information may be stored in a value of each vertex index. For example, the information may be stored in a highest bit of each individual vertex index.

In embodiments where such augmentation of the index data itself is not possible or desired (due to a limited size of the index, for example), the information may be stored in an information buffer that is separate from an index buffer in which the index data is stored. Optionally, such information buffer may be stored in main system memory. Again, the information may be stored in any manner that is or is not independent of the other data (e.g. vertex data, index data, etc.). Further, use of a combination of the foregoing techniques is even contemplated.

As another option, the information may include new information derived from the vertex data, and optionally the index data. Such new information may be derived prior to vertex processing, in one embodiment.

With continuing reference to FIG. 1, use of the vertex cache may be optimized utilizing the information. See operation 104. In the context of the present description, the optimization may refer to anything that results in the vertex cache being more effectively or efficiently used to accommodate vertex processing. In one embodiment, the vertex cache may be optimized by optimizing a performance of the vertex cache, utilizing the information.

For example, in one embodiment, the information may indicate whether the vertex data associated with at least one vertex is to be removed from the vertex cache prior to vertex data associated with at least one other vertex. For example, such indication may allow vertex data to be discarded that is less important than vertex data accommodated based on such discarding Additional information regarding various ways in which this may be accomplished will be described later in the context of different embodiments.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
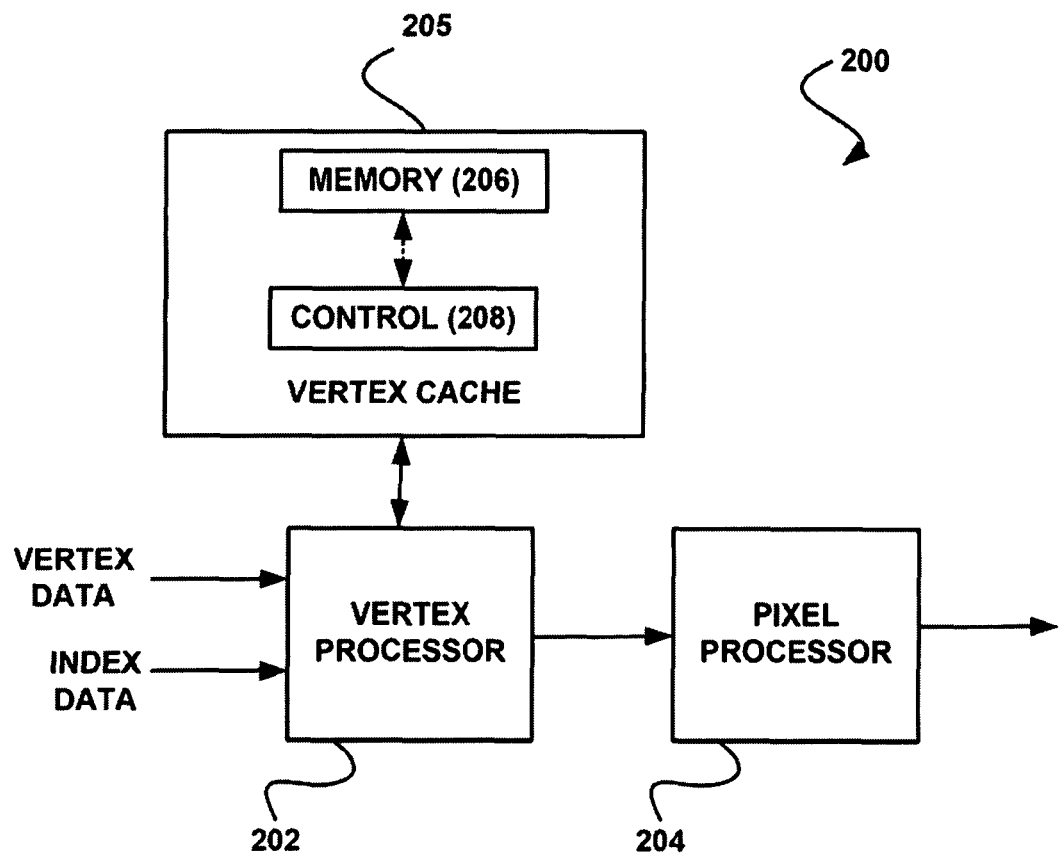
FIG. 2 shows a system with an optimized vertex cache, in accordance with one embodiment.

FIG. 2 shows a system 200 for with an optimized a vertex cache, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, included is a vertex processor 202 adapted for receiving vertex data input as well as index data input in the manner illustrated, for performing vertex processing. In one embodiment, such vertex processing may include transform operations, lighting operations, vertex shading, and/or any other processing involving vertices before being passed to subsequent modules (e.g. a pixel processor 204, etc.) for further processing. In one embodiment, the aforementioned vertex data may be provided by an unillustrated application (e.g. in the form of meshes, etc.) to a driver (not shown) that controls the vertex processor 202, etc. Further, as mentioned earlier, the index data may be used to access the vertex data when the abovementioned vertex processing is desired.

To facilitate the vertex processing performed by the vertex processor 202, a vertex cache 205 may remain in communication with the vertex processor 202. In the illustrated embodiment, the vertex cache 205 may include vertex cache memory 206 for temporarily storing vertex data under the control of a vertex cache control module 208. As shown, an optional communication link may be provided between the vertex cache memory 206 and the vertex cache control module 208.

In use, when vertex data is used in several primitives, such vertex data need not be separately transformed and lighted for each primitive. Thus, such vertex data may be cached in the vertex cache memory 206 for reuse, as needed. In one embodiment, the vertex cache 205 may employ least-recently-used (LRU) or first-in first-out (FIFO)-type logic to accomplish this.

Further, so that the aforementioned caching may be more intelligently performed, information may be stored for indicating how the vertex cache 205 may be optimized during use, including, for example, how performance of the vertex cache 205 may be optimized. As mentioned earlier, such information may indicate a priority order in which vertex data in the vertex cache memory 206 may be dropped. For example, each bit of the information may indicate a priority of associated vertex data.

In one embodiment, the information, and optionally any vertex indices associated therewith, may be identified. Further, a portion of vertex data in the vertex cache memory 206 may be discarded based on the information. Just by way of example, a portion of the vertex data associated with a lowest priority, as indicated by the information, may be discarded. In one embodiment, such optimization may be administered by the vertex cache control module 208 which may have access to the required information.

Of course, the information may be obtained in any desired manner. For example, as mentioned above, it may accompany the index data that is used to access the vertex data, etc. More details regarding the manner in which such information is gathered in accordance with various embodiments will be set forth during the description of FIGS. 3-4. Further, additional particulars as to the manner in which such information is used to optimize use of a vertex cache in accordance with one possible embodiment will be set forth during the description of FIG. 5.

In one embodiment, the foregoing optimization may be controlled utilizing the aforementioned driver and/or an application program interface (API) (e.g. OPENGL, DIRECTX, etc.). In one embodiment involving the OPENGL API, the aforementioned technique may be carried out via an implementation of a "glDrawElements" API function, which may allow for the use of vertex indexing. Furthermore, based on an OPENGL buffer object extension, the information may be identified only once when the buffer objects are initialized, and subsequently utilized multiple times when the data stored in the buffer objects is used for rendering. Of course, any API and/or an extension thereof may or may not be used to carry out the foregoing functionality.

It should be strongly noted that the foregoing arrangement of the system 200 is set forth for illustrative purposes only. Of course, other general processor components, inputs, state controllers, direct memory access (DMA) capabilities, etc. may or may not be provided, as desired. Further, while the vertex cache memory 206 and the vertex cache control module 208 are shown to be components of a single vertex cache 205, it should be noted that other embodiments are contemplated where they are separate. For example, the vertex cache control module 208 may be integrated in a different system component (e.g. the vertex processor 202, etc.).

Figure 3:
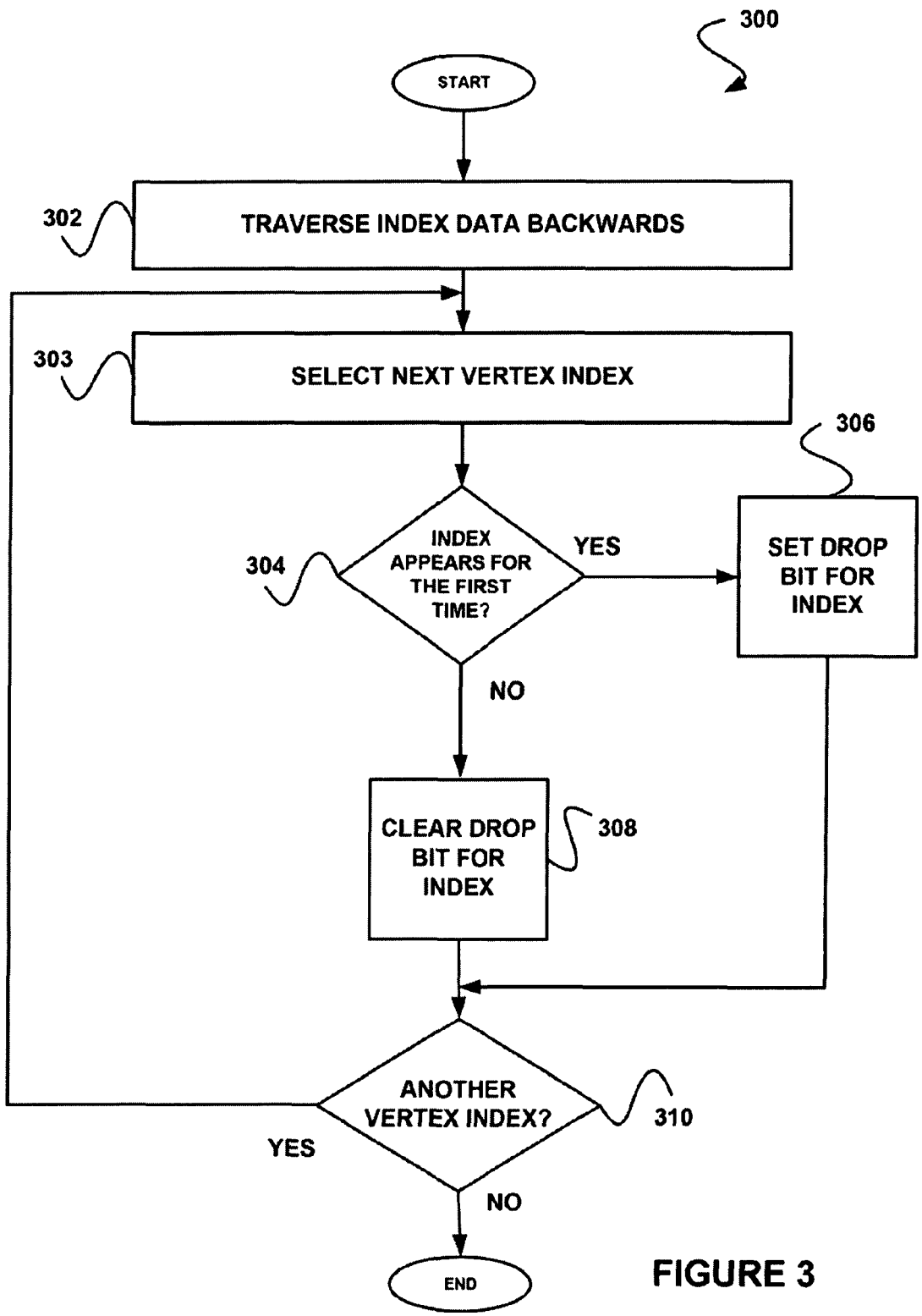
FIG. 3 shows a method for gathering information for utilization in optimizing use of a vertex cache, in accordance with one embodiment.

FIG. 3 shows a method 300 for gathering information for utilization in optimizing use of a vertex cache, in accordance with one embodiment. As an option, the present method 300 may be implemented in the context of the functionality and architecture of FIGS. 1-2. For example, the method 300 may be used to gather information for use by the vertex cache control module 208 of FIG. 2 in optimizing use of the vertex cache 205. To this end, the method 300 may be used to identify the information that is associated with the vertex data stored in the vertex cache, as described with respect to operation 102 of FIG. 1. Of course, however, the method 300 may be carried out in any desired environment. It should again be noted that the aforementioned definitions may apply during the present description.

As shown, the method 300 may be used to indicate a prioritized order according to which various vertex data associated with at least one vertex is to be removed (e.g. discarded, etc.) from a vertex cache (e.g. for accommodating new vertex data, etc.). As indicated in operation 302, this is accomplished based on a backwards traversal of index data associated with the vertex data. For example, the method 300 may start with a last index in an index buffer and step back one-index-at-a-time in the manner shown.

Specifically, a next vertex index is selected in operation 303, after which it is determined if the particular index appears for the first time in the backwards traversal order. See decision 304. For instance, if, as stepping backward, the method 300 identifies index data that correlates with the first instance of a particular vertex, it can be assumed that (since a backwards traversal is involved) such first instance is, in effect, the last reference to a corresponding vertex within an index array.

In such situation, the vertex data associated with such vertex may be dropped from the vertex cache since it will not be required thereafter. Thus, a drop bit associated with such index data may be set to indicate that it can be dropped. See operation 306.

On the other hand, if the currently selected index data does not correlate with a first instance of a particular vertex, such drop bit can be cleared. Note operation 308. This indicates that the vertex data associated with such indexed vertex will be subsequently required again, and thus should not be dropped.

As shown, the method 300 continues for each vertex index. See decision 310. To this end, the method 300 provides an algorithm to traverse an index buffer backwards and mark a first occurrence of each vertex index as the occurrence when the corresponding vertex data should be dropped.

The present technique may thus leverage the fact that a system has access to vertices that will be accessed next, since future index data is available for indicating when a vertex will be next needed. In use, the system knows when a vertex should be dropped from the vertex cache, and thus the cache may optionally be used twice as efficiently (in one exemplary embodiment). For example, in one common case involving a triangle mesh (stripped so that the rows will be rendered one after another), a conventional LRU or FIFO algorithm typically store vertices from two rows at all times, while the present technique may be used to leverage the fact that only one of the rows will be used by future triangles.

Figure 4:
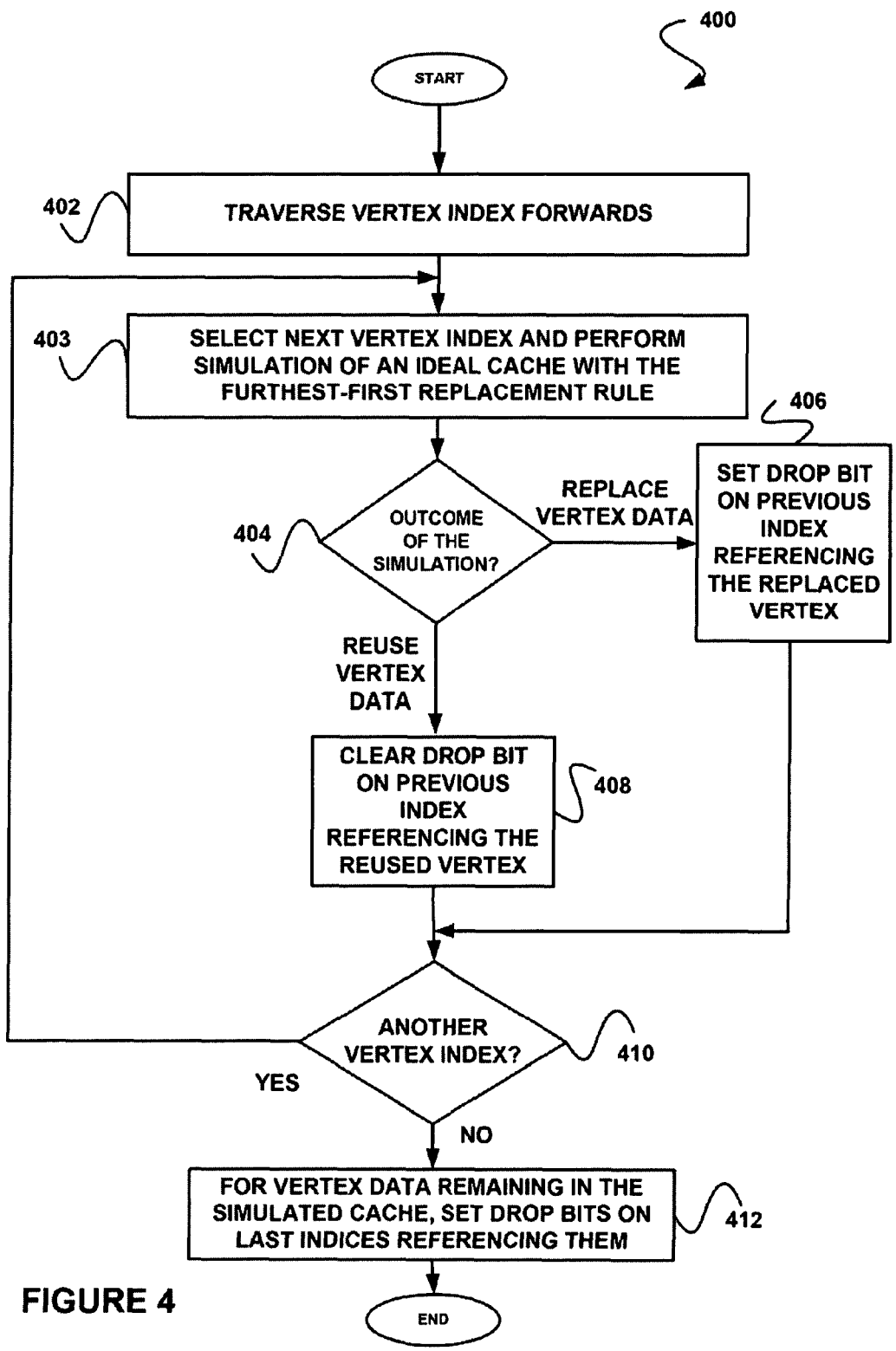
FIG. 4 shows a method for gathering information for utilization in optimizing use of a vertex cache, in accordance with another embodiment.

FIG. 4 shows a method 400 for gathering information for utilization in optimizing use of a vertex cache, in accordance with another embodiment. As an option, the present method 400 may be implemented in the context of the functionality and architecture of FIGS. 1-2. For example, the method 400 may be used to gather information for use by the vertex cache control module 208 of FIG. 2 in optimizing use of the vertex cache 205. To this end, the method 400 may be used to identify the information that is associated with the vertex data stored in the vertex cache, as described with respect to operation 102 of FIG. 1. Of course, however, the method 400 may be carried out in any desired environment. Again, the aforementioned definitions may apply during the present description.

As shown, the method 400 may be used to gather information that indicates a prioritized order according to which various vertex data associated with at least one vertex is to be removed. As indicated in operation 402, this is accomplished based on a forward traversal of index data associated with the vertex data. For example, the method 400 may start with a first index in an index buffer and step forward one-index-at-a-time in the manner shown.

The method 400 aims to make the behavior of the actual vertex cache match that of an ideal one as closely as possible. In particular, a next vertex is selected, after which a simulation of the ideal vertex cache is performed. Note operation 403. The simulated ideal vertex cache may, for example, employ the further-first (FF) replacement rule, which maximizes the utilization of the cache memory. As a result of the simulation, some vertex data in the simulated cache is either replaced or reused, as shown in decision 404.

If such vertex data was replaced by the ideal vertex cache, the data may never be reused by the simulation. Since the aim is to make the behavior of the actual cache match that of the ideal cache, the actual cache may also similarly not reuse such vertex data. Thus, as shown in operation 406, the drop bit associated with the previous index that referenced the replaced vertex data is set. In this way, utilizing the information contained in the drop bits, the actual vertex cache may prefer discarding the particular vertex data over discarding other vertex data.

Similarly, if some vertex data was reused by the ideal vertex cache, the aim is to also reuse that particular vertex data by the actual vertex cache. Accordingly, as shown in operation 408, the drop bit associated with the previous index that referenced the reused vertex data is cleared. In this way, the actual vertex cache may prefer discarding other vertex data over discarding the particular vertex data.

As shown, the method 400 continues for each vertex index. See decision 410. By this design, the method 400 scans through the index buffer in a forward direction and simulates a furthest-first (FF) cache for the vertices. Whenever vertex data associated with a vertex is discarded from the simulated cache, the drop bit is set for the index that represents the last reference to the cached vertex data. Additionally, after the loop terminates, drop bits are set for any indices associated with the vertex data still remaining in the simulated cache, as shown in operation 412. The information contained within the drop bits, generated through the use of the method 400, results in a minimal number of cache misses, when the index buffer is later processed by the actual vertex cache.

Figure 5A:
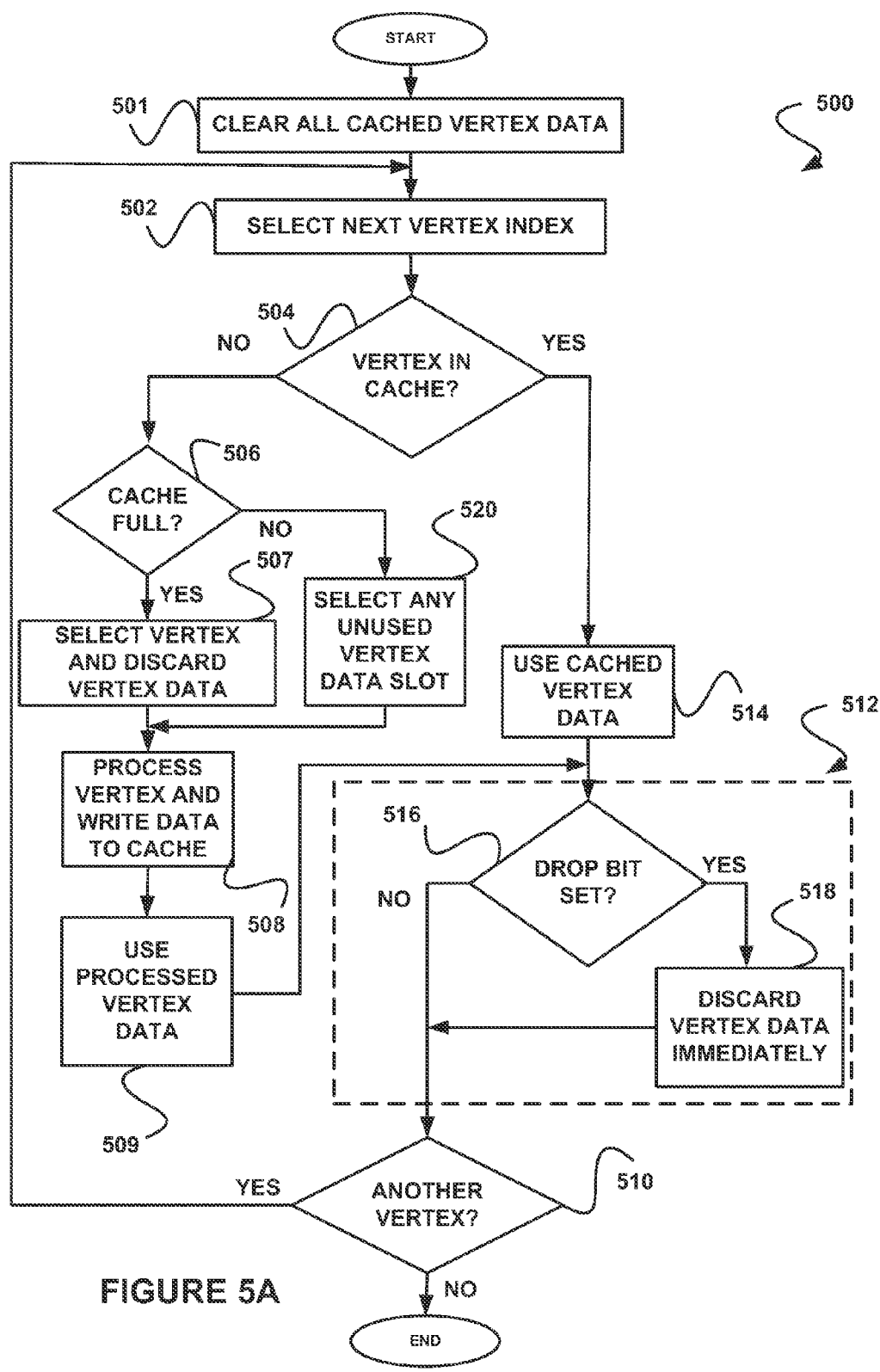
FIGS. 5A-B show methods for optimizing performance of a vertex cache utilizing information, in accordance with one embodiment.
Figure 5B:
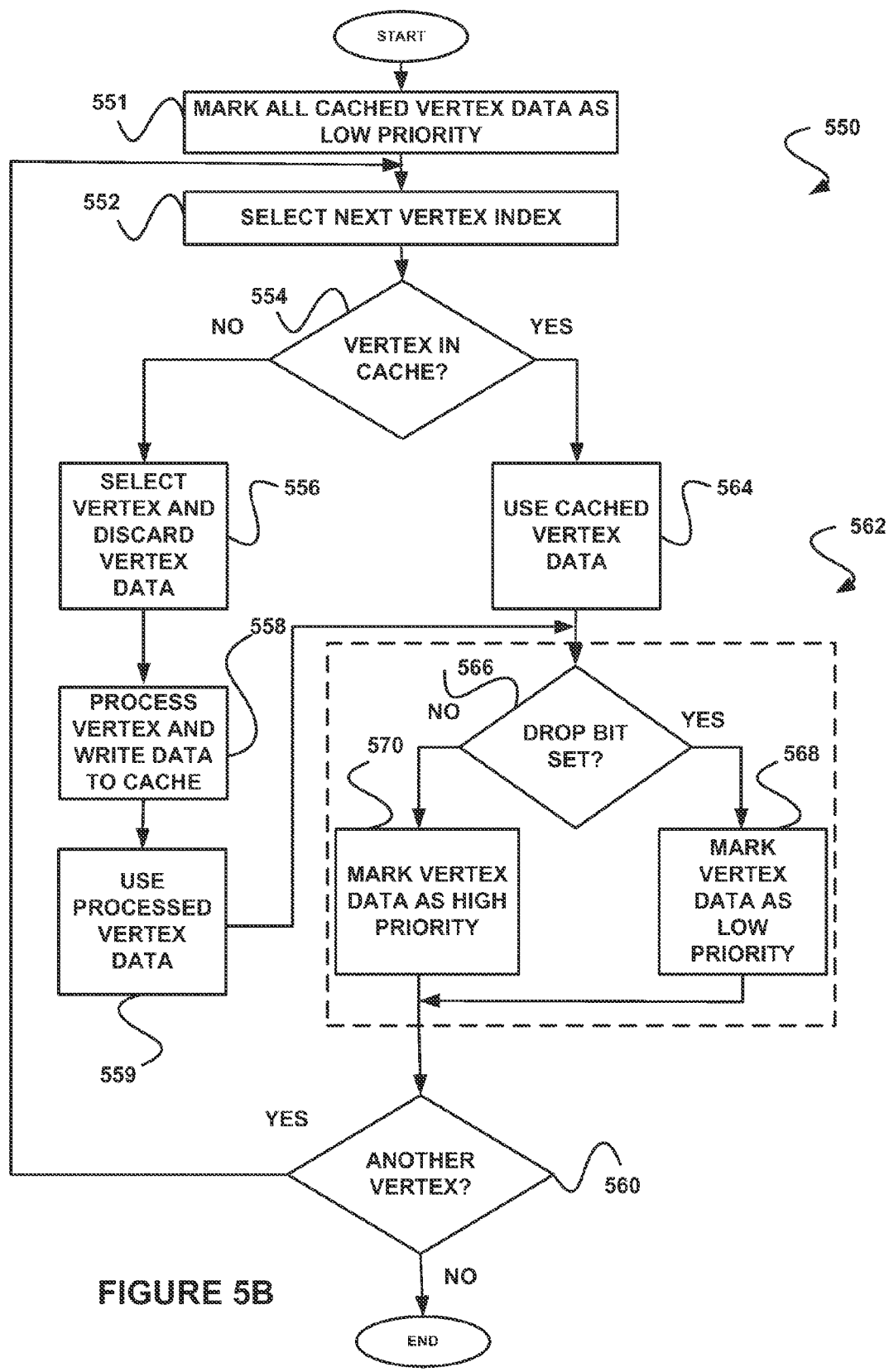

FIGS. 5A-B show methods 500, 550 for optimizing performance of a vertex cache utilizing information, in accordance with one embodiment. As an option, the present methods 500, 550 may be implemented in the context of the functionality and architecture of FIGS. 1-4. For example, the methods 500, 550 may be used to optimize use of the vertex cache 205 of FIG. 2. To this end, the methods 500, 550 may be used to optimize use of the vertex cache utilizing the information, as described above with respect to operation 104 of FIG. 1. Of course, however, the methods 500, 550 may be carried out in any desired environment. Yet again, the aforementioned definitions may apply during the present description.

With respect to FIG. 5A, and as shown in operation 501, all cached vertex data is cleared. In addition, as vertex data is being processed by appropriate hardware (e.g. vertex processor 202 of FIG. 2), vertex index data may be traversed by selecting a next vertex index. See operation 502. It is first determined, in decision 504, whether vertex data associated with the present indexed vertex is present in a vertex cache (e.g. vertex cache 205 of FIG. 2).

If it is determined that vertex data associated with the present indexed vertex is not present in the vertex cache, it is determined whether the cache is full. Note decision 506. In response to a determination that the cache is not full, any unused vertex data slot is selected, as shown in operation 520. In response to a determination that the cache is full, a vertex is selected and vertex data associated with such vertex is discarded (for making additional storage space available). Note operation 507. Of course, such vertex data may be selected using any desired algorithm (e.g. LRU, FIFO, etc.).

To this end, the indexed vertex selected in operation 502 may be processed by retrieving associated vertex data from memory and processing (e.g. transforming, lighting, shading, etc.) the same. Note operation 508. After being processed, the vertex data may be written to the vertex cache so that it is available later (operation 508). Accordingly, the processed vertex data may be used, as shown in operation 509. The method 500 may then proceed to operation group 512, as described below.

With reference again to decision 504, if it is determined that data associated with the present indexed vertex is present in the vertex cache, cached vertex data may be used in operation 514, as opposed to the process-intensive path involving operation 508. Further, the abovementioned optimization may be leveraged in operation group 512, as shown.

In particular, after the cached vertex data is used, it may be determined whether it should be thereafter dropped from the vertex cache. In particular, it may be determined whether a drop bit associated with the appropriate index data is set. See decision 516. As mentioned earlier, such bit may be set in situations where it is known that the present vertex data will not be subsequently required.

If the drop bit is set, the vertex data may be removed from the vertex cache. See operation 518. By doing so, more space is made available for storing other vertex data that will be required, thus avoiding the expensive processing of operation 508 to the extent possible.

Thus, with respect to the present method 500, the vertex data may unconditionally be removed from the vertex cache. Again, the method 500 continues for each vertex index. See decision 510.

With respect to FIG. 5B, and as shown in operation 551, all cached vertex data is marked as low priority. In addition, as vertex data is being processed by appropriate hardware (e.g. vertex processor 202 of FIG. 2), vertex index data may be traversed by selecting a next vertex index. See operation 552. It is first determined, in decision 554, whether vertex data associated with the present indexed vertex is present in a vertex cache (e.g. vertex cache 205 of FIG. 2).

If it is determined that vertex data associated with the present indexed vertex is not present in the vertex cache, vertex data in the vertex cache may be selected to discard (for making additional storage space available). Note operation 556. Of course, such vertex data may be selected using any desired algorithm whose operation is in some way affected by the priorities associated with the vertex data.

To this end, the indexed vertex selected in operation 552 may be processed by retrieving associated vertex data from memory and processing (e.g. transforming, lighting, shading, etc.) the same. No operation 558. After being processed, the vertex data may be written to the vertex cache so that it is available later (note operation 558). Further, the processed vertex data is used, as shown in operation 559. The method 550 may then proceed to operation group 562, as described below.

With reference again to decision 554, if it is determined that data associated with the present indexed vertex is present in the vertex cache, cached vertex data may be used in operation 564, as opposed to the process-intensive path involving operation 558. Further, the abovementioned optimization may be leveraged in operation group 562, as shown.

In particular, after the cached vertex data is used, it may be determined whether it should be thereafter dropped from the vertex cache. In particular, it may be determined whether a drop bit associated with the appropriate index data is set. See decision 566. As mentioned earlier, such bit may be set in situations where it is known that the present vertex data will not be subsequently required.

If the drop bit is set, the vertex data may be marked as low priority. See operation 570. If, on the other hand, the drop bit is not set, the vertex data may be marked as high priority. See operation 568. Thus, with respect to the present method 550, the vertex data may be discarded as a function of additional logic (e.g. a prioritization, etc.) for further avoiding the expensive processing of operation 558 to the extent possible. Again, the method 550 continues for each vertex index. See decision 510.

Figure 6:
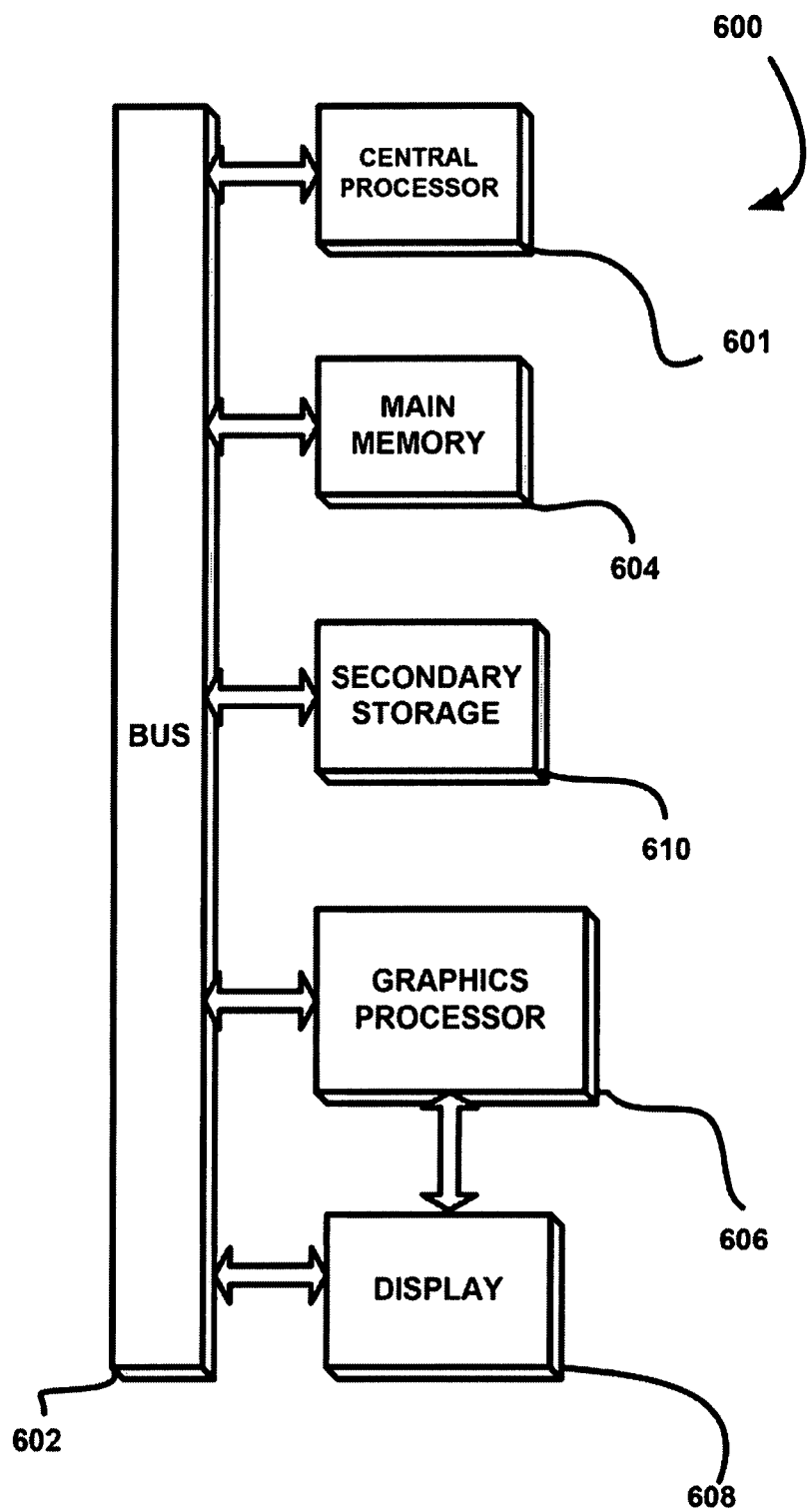
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices m including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising: a vertex cache memory for storing vertex data; a buffer implemented in a memory, wherein the buffer includes index data associated with the vertex data; and a vertex cache controller in communication with the vertex cache memory for identifying information associated with the vertex data, wherein the vertex cache controller is configured to, during a backwards traversal of the index data in the buffer, select a vertex index associated with the vertex data, and, if the selected vertex index does not correlate with a first instance of a particular vertex in the backwards traversal, the vertex cache controller is configured to clear a drop bit associated with the selected vertex index indicating that the vertex data associated with the selected vertex index should not be discarded from the vertex cache memory, and, if the selected vertex index correlates with the first instance of the particular vertex in the backwards traversal, the vertex cache controller is configured to set the drop bit associated with the selected vertex index indicating that the vertex data associated with the selected vertex index should be discarded from the vertex cache memory.

2. The apparatus of claim 1, wherein each bit of the information is associated with one of the vertex indices associated with the vertex data.

3. The apparatus of claim 1, wherein the information is stored in a highest bit of each of the vertex indices.

4. The apparatus of claim 1, wherein the vertex cache controller discards a portion of the vertex data from the vertex cache memory, based on the information.

5. The apparatus of claim 1, wherein the vertex cache controller discards a portion of the vertex data from the vertex cache memory associated with a lowest priority.

6. The apparatus of claim 1, wherein each bit of the information indicates a priority of associated vertex data.

7. The apparatus of claim 1, wherein the vertex cache memory and the vertex cache controller are components of a processor that remains in communication with memory and a display via a bus.

8. A method, comprising: identifying information associated with vertex data stored in a vertex cache, wherein the information corresponds with index data associated with the vertex data; selecting, during a backwards traversal of the index data, a vertex index associated with the vertex data; and if the selected vertex index does not correlate with a first instance of a particular vertex in the backwards traversal, clearing a drop bit associated with the selected vertex index indicating that the vertex data associated with the selected vertex index should not be discarded from the vertex cache, and if the selected vertex index correlates with the first instance of the particular vertex in the backwards traversal, setting the drop bit associated with the selected vertex index indicating that the vertex data associated with the selected vertex index should be discarded from the vertex cache.

9. The method of claim 8, wherein the information is separate from the vertex data.

10. The method of claim 8, wherein the information is stored in association with index data associated with the vertex data.

11. The method of claim 10, wherein the information includes a bit.

12. The method of claim 8, wherein the information indicates a priority of the vertex data.

13. The method of claim 12, wherein the vertex cache is optimized by removing the vertex data from the vertex cache utilizing the information.

14. A computer program product embodied on a non-transitory computer readable medium, comprising: computer code for identifying information associated with vertex data stored in a vertex cache, wherein the information corresponds with index data associated with the vertex data; and computer code for selecting, during a backwards traversal of the index data, a vertex index associated with the vertex data; and if the selected vertex index does not correlate with a first instance of a particular vertex in the backwards traversal, clearing a drop bit associated with the selected vertex index indicating that the vertex data associated with the selected vertex index should not be discarded from the vertex cache, and if the selected vertex index correlates with the first instance of the particular vertex in the backwards traversal, setting the drop bit associated with the selected vertex index indicating that the vertex data associated with the selected vertex index should be discarded from the vertex cache.

* * * * *